Feb. 5, 1952      S. F. BASHARA      2,584,831
CUSHION FOR FOOT PEDALS
Filed May 20, 1950
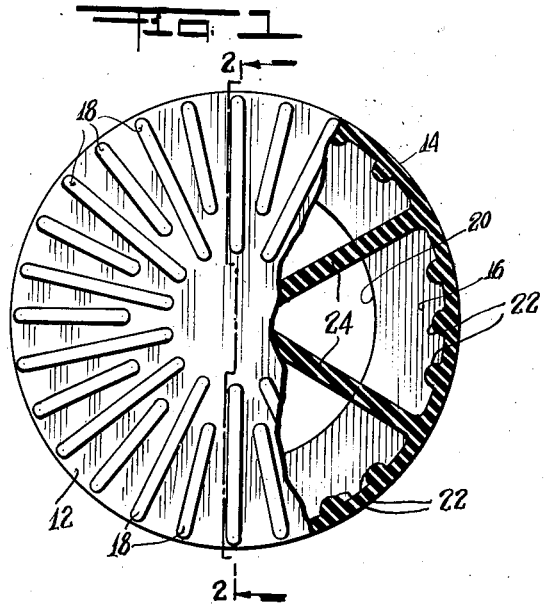
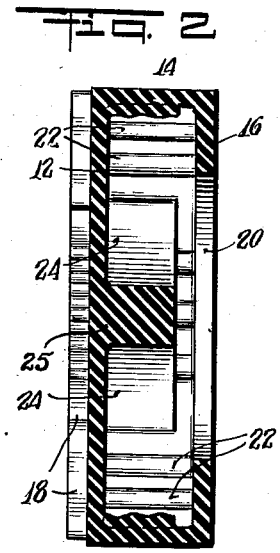
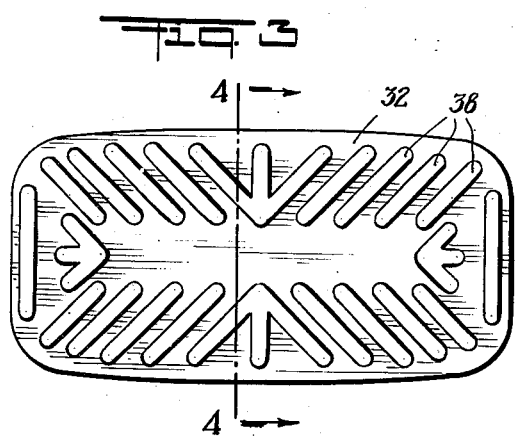
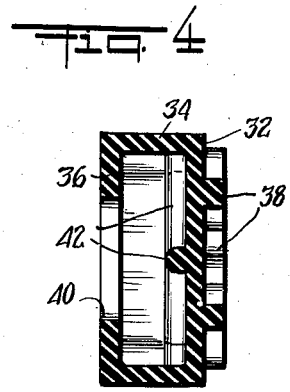
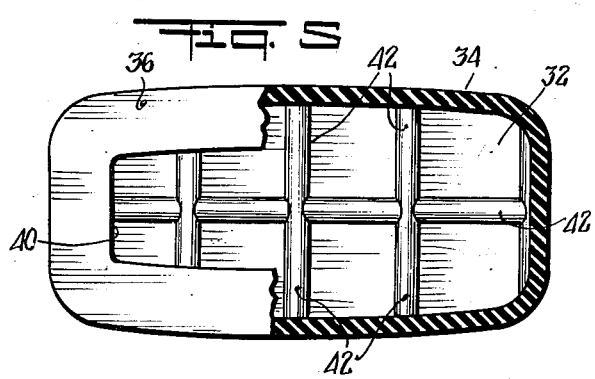
INVENTOR.
Samuel F. Bashara
BY
Charles E. Lightfoot
ATTORNEY Patented Feb. 5, 1952

2,584,831

UNITED STATES PATENT OFFICE 2,584,831

CUSHION FOR FOOT PEDALS

Samuel F. Bashara, Houston, Tex.

Application May 20, 1950, Serial No. 163,125

4 Claims. (Cl. 74—563)

This invention relates to a cushion for foot pedals, and more particularly to a device for application to foot pedals to provide a shock absorbing medium between the pedal and the foot of the operator.

The invention finds particular application in connection with the foot pedals of motor vehicles, wherein a large amount of vibration is developed, which in the absence of some intervening shock absorbing means is transmitted to the body of the operator through the pedals. The continued shock resulting from the direct transmission of vibration through the pedals to the feet of the driver has the effect of promoting nervous strain and fatigue, thus rapidly tiring the driver.

Under these conditions the nerves of drivers' limbs are affected, and long periods of driving, without some means of absorbing the vibration transmitted by the pedals, may exhaust the driver to the extent that it is unsafe for him to continue.

It is the principal object of the present invention to provide improved shock absorbing means adapted to be applied to foot pedals, whereby vibrations transmitted by the pedals are prevented from reaching the feet of the operator.

Another object of the invention is the provision of a cushion for foot pedals having a reenforced internal structure giving the device added strength and durability without substantially decreasing its vibration absorbing ability.

A further object of the invention is to provide a pedal cushion device having means for effectively preventing the slipping of the operator's foot from the pedal.

Another object of the invention is the provision of a shock absorbing device for foot pedals having means for the entrapment of air therein whereby the cushioning effect of the air is added to the resiliency of the material of the device to improve the shock absorbing efficiency of the device.

A still further object of the invention is to provide a cushion for foot pedals which is of strong and durable construction and having high wear resisting qualities.

The invention will best be understood from the following detailed description constituting a specification of the same when taken in conjunction with the annexed drawings, wherein:

Figure 1 is a top plan view of the invention partly in section;

Figure 2 is a cross sectional view taken along the line 2—2 of Figure 1, looking in the direction indicated by the arrows;

Figure 3 is a top plan view of a slightly different form of the invention;

Figure 4 is a cross sectional view taken along the line 4—4 of Figure 3, looking in the direction indicated by the arrows, and;

Figure 5 is a bottom plan view of the invention as seen in Figure 3.

Referring now to the drawings in greater detail in the form of the invention illustrated in Figures 1 and 2, the numeral 12 indicates the upper wall of the cushion which also has a side wall 14 and a lower wall 16 forming a hollow pedal enclosing structure. The upper wall 12 is provided with a plurality of spaced upstanding projections 18 thereon providing an anti-slipping tread. The lower wall has an opening 20 therein, whereby the cushion can be readily positioned over a pedal to enclose the same.

The projections 18, in the present illustration are radially disposed about the center of the upper wall 12 and are peripherally spaced thereon, but it will be understood that other arrangements of the projections could be provided with equally satisfactory results.

Inside the device the side wall 14 is formed with internal ribs 22 extending between the upper and lower walls to give added strength to the side wall without substantially decreasing the flexibility of the same. A plurality of radially extending webs 24 divide the interior of the cushion into compartments or cells, these webs being formed integrally with the upper and side walls and terminating in a plane spaced from the bottom wall. The webs 24 merge centrally of the cushion to form a thickened reenforcing portion 25, as best seen in Figure 2 of the drawings.

The entire cushion structure described above is preferably formed in one piece of a strong, resilient material such as rubber or the like, and the arrangement of the parts is such that the cushion may be stretched into position over a pedal, with the pedal extending through the opening 20 and into the space between the terminal plane of the webs 24 and the bottom wall. In this position the lower wall extends beneath the pedal and the edges of the webs 24 bear on the upper surface of the pedal to securely retain the cushion in place. The thickened, central portion 25 engages the pedal and tends to reenforce the webs 24 to prevent collapsing of the cushion.

When the operator depresses the pedal by pressing with his foot on the upstanding tread of the cushion, the webs 24 are pressed against the pedal, and due to the resiliency of the walls and webs, and the entrapped air in the cells or chambers inside the device, any shock transmitted through the pedal is absorbed before the same reaches the operator's foot.

In the form of the invention shown in Figures 3, 4, and 5, the cushion device is formed with an upper wall 32, side wall 34 and lower wall 36. Upstanding spaced projections 38, are provided on the upper wall forming a tread surface thereon.

An opening 40 is formed in the lower wall for the insertion of the pedal into the cushion.

Within the pedal enclosing structure thus formed, ribs 42 are provided beneath the upper wall, which ribs extend downwardly and form compartments or cells on the inside of the cushion. Between the lower edges of the ribs 42 and the lower wall 36 there is a space to accommodate the pedal on the inside of the cushion.

This form of the invention is used in the same manner as that previously described, being stretched over the pedal and positioned thereon for engagement by the foot of the operator as he depresses the pedal, and being effective to absorb shocks and vibrations which would otherwise be transmitted through the pedal to the body of the operator.

It will thus be seen that the invention as described above provides a pedal cushion of simple design and rugged construction, capable of long withstanding the continuous use to which such articles are customarily subjected, and which operates as an efficient shock absorbing device to minimize the strain on the operator due to the direct transmission of vibration through the pedal.

While the invention has been disclosed in connection with certain specific embodiments of the same, it is to be understood that these are by way of example only, and many changes in the form and structure of the device can be made, as well as in the material employed, can be made without departing from the spirit of the invention or the scope of the appended claims.

Having thus clearly shown and described the invention, what is claimed as new and desired to secure by Letters Patent is:

1. A cushion for foot pedals comprising a hollow body formed of resilient material, upper and lower walls on said body, said lower wall having an opening for the insertion of a pedal into the body, merging web means forming a thickened centrally located reinforcing portion on said upper wall extending within said body and cooperable with said lower wall to retain said body on said pedal.

2. A cushion for foot pedals comprising a hollow body formed of resilient material, upper and lower walls on said body, said lower wall having an opening for the insertion of a pedal into the body and a marginal portion surrounding said opening engageable with the bottom surface of the pedal, means forming a centrally located thickened reenforcement on said upper wall extending within said body and engageable with the top surface of said pedal and cooperable with said lower wall to retain said body on the pedal, and a plurality of radially extending ribs forming an upstanding tread on the outside of said upper wall.

3. A cushion for foot pedals comprising a hollow body formed of resilient material, upper and lower walls on said body and a peripheral wall joining said upper and lower walls, said lower wall having an opening for the insertion of a pedal into the body and a marginal portion surrounding said opening engageable with the bottom surface of the pedal, radially disposed webs on said upper wall extending within said body and engageable with the top surface of said pedal, said webs merging centrally of the body to provide a laterally thickened reenforcing portion and being cooperable with the lower wall to retain the body on the pedal, and spaced reenforcing ribs in said body on said peripheral wall.

4. A cushion for foot pedals comprising a hollow body formed of resilient material, upper and lower walls on said body and a peripheral wall joining said upper and lower walls, said lower wall having an opening for the insertion of a pedal into the body and a marginal portion surrounding said opening engageable with the bottom surface of the pedal, radially disposed webs on said upper wall extending within said body and engageable with the top surface of said pedal, said webs merging centrally of the body to provide a laterally thickened reenforcing portion and being cooperable with the lower wall to retain the body on the pedal, spaced reenforcing ribs in said body on said peripheral wall and a plurality of radially extending ribs forming an upstanding tread on the outer surface of said upper wall.

SAMUEL F. BASHARA.

REFERENCES CITED

The following references are of record in the file of this patent:

UNITED STATES PATENTS

| Number | Name | Date |
| --- | --- | --- |
| 1,557,400 | Barrett et al. | Oct. 13, 1925 |
| 1,810,625 | Rouse | June 16, 1931 |